April 4, 1967 M. F. BOLSTER 3,312,914

HIGH POWER MICROWAVE LOAD

Filed April 29, 1965 3 Sheets-Sheet 1

INVENTOR:
MORRIS F. BOLSTER,

BY James J. Lichiello

HIS ATTORNEY.

April 4, 1967 M. F. BOLSTER 3,312,914

HIGH POWER MICROWAVE LOAD

Filed April 29, 1965 3 Sheets-Sheet 2

INVENTOR:
MORRIS F. BOLSTER,

BY James J. Lichiello

HIS ATTORNEY.

INVENTOR:
MORRIS F. BOLSTER,
BY James J. Lichiello
HIS ATTORNEY.

3,312,914
HIGH POWER MICROWAVE LOAD

Morris F. Bolster, Schenectady, N.Y., assignor to General Electric Company, a corporation of New York Filed Apr. 29, 1965, Ser. No. 451,786
8 Claims. (Cl. 333—22)

This invention relates to a high power microwave load and more particularly to a high power microwave load having improved means to provide a uniform power absorption.

Progress in microwave power generating devices and particular applications for their utilization has resulted in increased emphasis on methods and apparatus to accurately measure the generated high power or to effectively absorb high power. The present trend of development of superpower high frequency tubes requires the use of higher power absorbing loads than are currently available.

One method of absorbing high power in a load includes propagating the high power through a waveguide which is usually surrounded by a cooling absorbing fluid, usually water. The cooling fluid absorbs the high power through a suitable wall transfer means resulting in a temperature rise of the coolant. The overriding problem of absorption of high power microwaves is exemplified as the need to spread or disperse the power evenly over the power absorbing regions while at the same time providing adequate means for cooling or heat transfer. The operative characteristics of the power absorption must include a matched condition at the power input to prevent power reflection from the power absorbing device. The foregoing feature must be incorporated in a structure of reasonable size commensurate with the application utilizing high microwave power.

Prior methods of measuring or absorbing power utilize, in general, a waveguide arrangement which is immersed in a cooling fluid, such as for example, an output horn contained within a dielectric hemispherical shell outside of which an absorbing and cooling fluid is circulated. A further prior method utilizes a tapered dielectric tube filled with a flowing absorbing coolant and placed inside a waveguide apparatus. The salient problems associated with these prior art methods and apparatuses include a difficulty of matching the input conditions over any appreciable bandwidth, breakage of the dielectric coolant tube or arcing at the outside surfaces of the tube and boiling of the coolant near the small end of the tube, et cetera.

A further microwave load absorbing means has been constructed in the form of a rectangular waveguide propagating the $H_{10}$ mode by use of a long axial slot in the sidewall with a waterfilled dielectric tube adjacent the slot. Difficulties with this arrangement are associated with the beginning of the slot, since the beginning of the slot introduces a considerable discontinuity in the line by reason of interruption of sidewall current. Also, the power dissipated is a constant proportion of the power flowing in the waveguide and any position along the line and the result is an exponential decay of line power for this type of loading with most of the power absorbed near the beginning of the slot. This results in excessive heating and possible failure by high voltage arcing near the beginning of the slot.

Accordingly, it is an object of this invention to provide an improved microwave power load.

It is yet another object of this invention to provide an improved high power microwave load with uniform power absorption characteristics over the entire length of the absorbing region.

It is yet another object of this invention to provide an axially tapered (rectangular) cross section waveguide with uniform power absorbing characteristics axially.

It is another object of this invention to provide a rectangular cross section waveguide power absorbing load whose effective width is substantially greater than its thickness or height, and whose width progressively diminishes axially over its effective length to provide uniform power absorbing characteristics.

It is a still further object of this invention to provide a rectangular cross section waveguide high microwave power load whose effective sidewall thickness or height on each side thereof constitutes a dielectric tube, containing a flowing absorbing coolant. The width of the waveguide, specifically the spaced apart dimension of the coolant tubes, progressively diminishes at axial positions along its length.

Briefly described, this invention comprises in one of its preferred forms a generally rectangular cross section waveguide whose effective width is usually substantially greater in terms of wavelength in order to reduce transverse and sidewall currents. The rectangular waveguide width tapers or diminshes from a wide input to a narrow opposite or terminating end along the axial length of the waveguide at a rate to provide proper power attenuation along the entire length. At the same time the sidewalls constituting the thickness of the rectangular waveguide include the corresponding sidewall of a dielectric coolant tube along the effective length of the waveguide for power absorption means. The height of the waveguide is generally slightly less than a half wavelength free space.

Further objects and features of this invention will be more fully understood when taken in connection with the following description and the drawings in which FIG. 1 is an isometric projection of one preferred embodiment of this invention;

Figure 8:
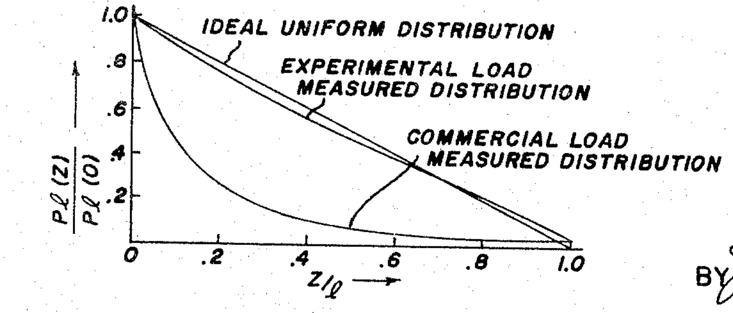
Figures 9, 10:
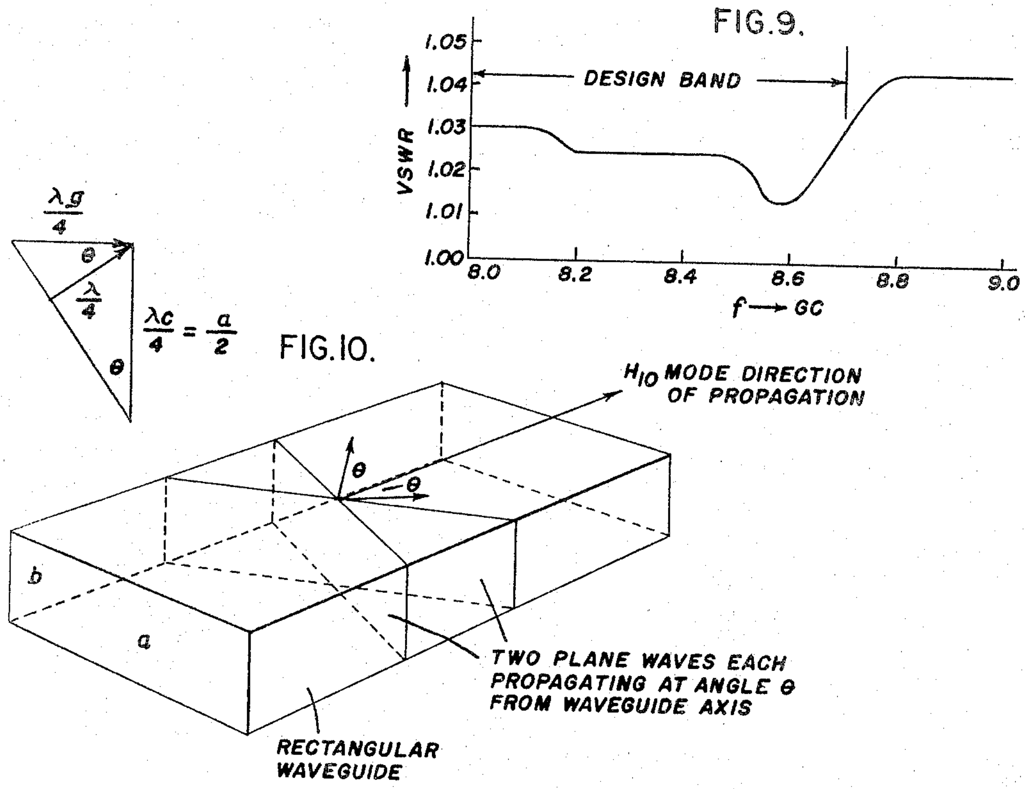
Figure 11:
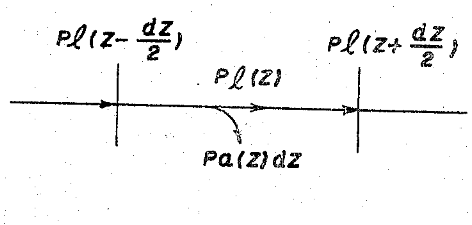
Figure 12:
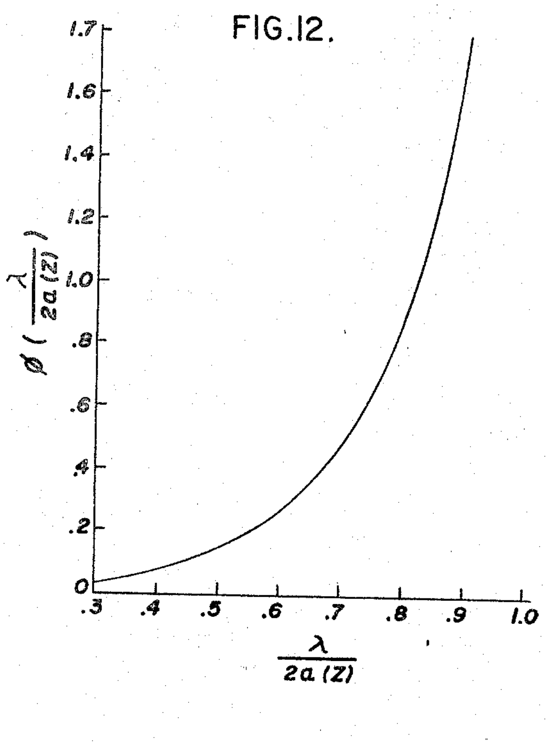

FIG. 8 includes a series of curves showing distribution of power in a load of this invention;

FIG. 9 is a curve illustrating the VSWR of a load device of this invention;

FIG. 10 is a graphical illustration of wave propagation through a rectangular waveguide, FIG. 11 is a schematic representation of power relations along a short section of a line;

FIG. 12 is a graph from which values of $\lambda/2\alpha(z)$ may be obtained.

Figures 1, 2:
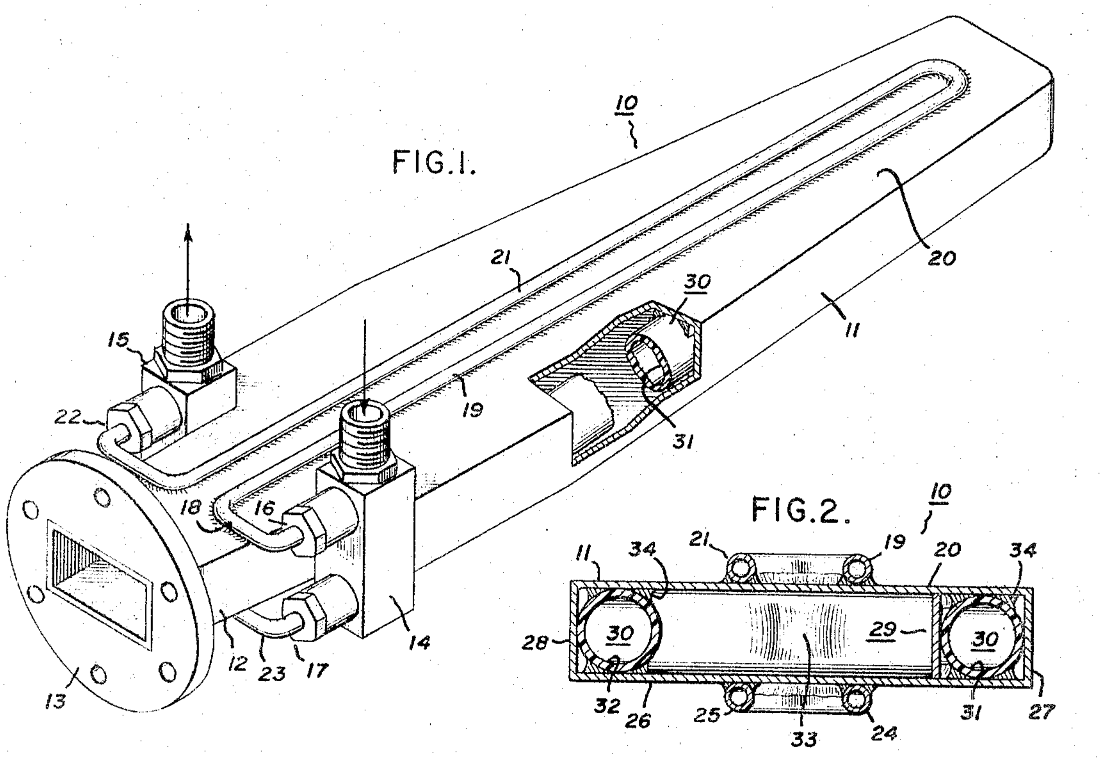
FIG. 2 is a cross sectional view of FIG. 1 along line 2—2 of FIG. 3 illustrating the internal power absorption means.

Referring now to FIG. 1, there is illustrated an improved microwave power absorbing load 10 incorporating the preferred embodiments of this invention. The load device 10 includes a waveguide body 11 of generally flattened or rectangular cross section whose cross sectional width or longer dimension laterally is substantially greater than the height or thickness dimension vertically in terms of wavelengths. Waveguide body 11 comprises an axially extending rectangular cross section unit suitably formed of a metal such as, for example, sheet copper, aluminum, or brass, and composed of a plurality of separate strips which are suitably brazed or soldered to provide the rectangular cross section construction. Waveguide body 11 has connected thereto the form of a rectangular cross section neck extension 12 fitted with a suitable mounting flange 13 for mounting of the waveguide section to a suitable microwave power generating device. Neck 12 may be a transitional element and of a tapered configuration to connect the rectangular input of the load to a waveguide of different size rectangular cross section. While the neck section defines a general input end of the device, the effective input end of the waveguide section 11, and of load device 10, is more specifically defined as the beginning portion of the waveguide body 11 which contains the power absorbing means.

As previously described, the operation of the load device 10 is dependent upon the absorption of high microwave power with attendant very high temperature rise as an indication of the power absorption characteristics. In order to cool the device 10, a coolant system is employed which will circulate a desired coolant fluid, for example water, not only through the waveguide for direct power absorption, but also externally along the waveguide for heat transfer. In FIG. 1, external portion of the cooling system includes, in one form, an inlet manifold 14 and an exit manifold 15, each of which is oppositely positioned at the juncture of the body section 10 and neck extension 12. Inlet manifold 14 includes a pair of branch takeoff connections 16 and 17. Attached to takeoff connection 16, for example, is a coolant tube 18 of preferably copper, one part of which, forward section 19, leads from the takeoff connection 16 and progresses down the axial length of the waveguide along the upper surface 20, reverses to define a corresponding reverse section 21, and connects to an exit connection 22 on outlet manifold 15. Similarly, tube 23 is connected to inlet 14 and includes forward and return sections 24 and 25 respectively (not shown) adjacent the under side 26 of waveguide 11 which connect to outlet manifold 15. The coolant tubes are illustrated in the form of small diameter copper tubes which are suitably brazed, soldered or otherwise joined to the axial length of waveguide 11. However, the cooling system may be an internal one, i.e., a double-walled waveguide or other such form of cooling system effective to carry away a large amount of heat from the waveguide walls.

The important portion of the cooling system which directly absorbs most of the power is illustrated in FIG. 2 taken in combination with FIG. 1. Referring now to FIG. 2 there is illustrated a cross sectional view of the embodiment of FIG. 1 taken along a line adjacent the manifolds 14 and 15. In FIG. 2 the described cooling tubes 19, 21, 24 and 25 are illustrated in their operative relationship. Waveguide section 11 is also illustrated as having a width dimension substantially greater than its height dimension. The width and height of the waveguide are controlled or otherwise predetermined for a specific set of operating conditions. It has been discovered that as the waveguide width varies or diminishes from a very wide dimension (in terms of free space wavelengths) at the effective input end, to the cutoff size for the $H_{10}$ mode at the opposite axial end, the ratio of transverse to longitudinal current which is generated in the waveguide walls varies from a small value to infinity. It has been further discovered that if the width of waveguide 11 is made quite large, then the transverse, or sidewall currents in sidewalls 27 and 28, will be very small and any of the ordinary irregularities such as holes or slots in the sidewall cause only small reflections in the propagating wave. Accordingly, the load device of this invention utilizes a width which is sufficient to minimize reflections in the waveguide, while at the same time the waveguide is tapered over its effective axial length so that a proper rate of attenuation per unit length is obtained therealong. The referred to taper in exaggeration provides a generally truncated pyramid shape to waveguide 11 because the two sidewalls 27 and 28 approach each other starting from the neck section 12 and ending at the opposite or terminating end.

Because of the large width dimension with attendant minimal wall reflections from irregularities or slots, one such irregularity may be utilized for power absorption purposes. For example, the irregularities may take the form of laterally opposite sidewall absorbers extending along the axial length of the waveguide, such as for example fluid filled conduits for absorbing power. More particularly, as illustrated in FIG. 2, in one form of this invention the power absorbing means 29 is in the form of a dielectric tube 30 whose forward section 31 is connected at one end to inlet manifold 14 of FIG. 1, and whose other end of return section 32 is connected to the exit manifold 15 of FIG. 1. The forward and return section 31 and 32 of tube 30 are fitted with a metal return bend crossover 33 at the opposite end of the waveguide. Alternately, one manifold may be placed at the front (input) end of the load and another manifold at the back (terminating) end and the absorbing and cooling fluid circulated from front to back in both absorbers. A suitable absorbing and cooling fluid is therefore circulated through the tube 30 by means of the described manifolds. Because of the positioning of the manifolds 14 and 15 in a shoulder arrangement the connection between tube 30 and the manifolds 14 and 15 is direct and perpendicular. At the same time the walls of neck section 12 project generally coextensively into waveguide 11 and define the starting point for power absorption in waveguide 11. The dielectric tube 30 may be made of various materials, more particularly those materials which are ordinarily untilized for high power usage, i.e., various nonmetals such as plastics, ceramics, et cetera. It has been found that the diameter of dielectric tube 30 should be of a maximum in order to maximize the power handling capabilities. In one preferred form of this invention the outside diameter of tube 30 was substantially the same as vertical height of the waveguide sidewalls 27 and 28. The spaced apart dimension of tube sections 31 and 32 at the inlet end of the waveguide 11 or at the manifolds 14 and 15 should be of a dimension sufficient to reduce the initial attenuation and to minimize the effects of the interruption of wall currents at the beginning of the slots. The waveguide will then taper inward to its cutoff width at the other axial end of the waveguide. In one preferred form of this invention the distance between dielectric tubes along the width dimension of the waveguide was about 1.5 inches at the effective input end particularly at the starting point for power absorption. At the same time the vertical height dimension of the waveguide 11 interiorly was about 0.622 inch.

In one practice of this invention dielectric tube 30 was of Teflon with a constant inside diameter of 0.5 inch and a constant outside diameter of 0.622 inch over its effective length within the waveguide. This tube 30 was retained in the position as illustrated in FIG. 2 by means of a suitable dielectric cement 34. A metal retaining bead may be utilized in lieu of the cement 34. The general tube-slot arrangement may be replaced by a pair of R.-F. transferring wall sections which define forward or forward and return channels in the manner of tube sections 31 and 32.

It has been found desirable to minimize the effects of discontinuites at the beginnings of the slot or tube sections 31 and 32. This discontinuity is represented by the change from the metal sidewall of neck section 12 to the sidewall portion of waveguide 11 which includes the R.-F. absorption means in the form of tube 30. The beginning points of these transitions are usually not only oppositely disposed laterally along a line perpendicular to the longitudinal axis of the waveguide 11 but also axially equidistant from inlet flange 13. It has been discovered that these effects may be minimized by placing the beginning of one of the slots or tube sections a predetermined distance axially along the waveguide from the other. More particularly, it has been found that by spacing the beginning of one slot approximately a quarter guide wavelength along the waveguide axially from the other provides good results in the practice of this invention. This spacing is more clearly illustrated in FIG. 3.

Figure 3:
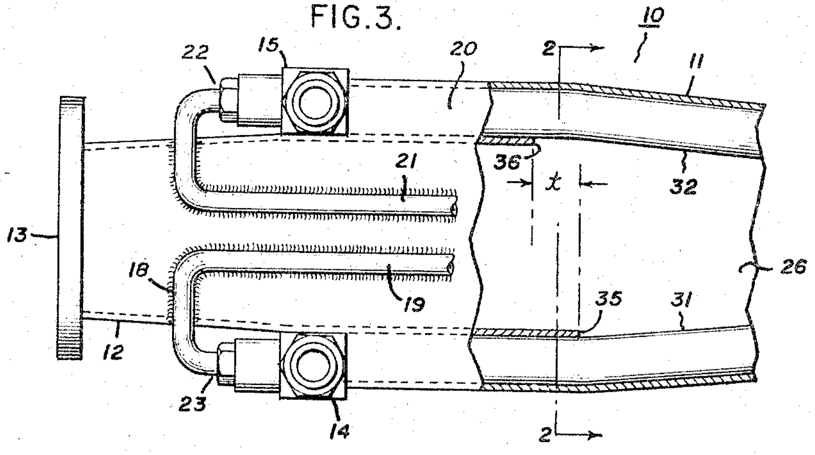
FIG. 3 is a cross sectional horizontal view of the invention of FIG. 1.

Referring now to FIG. 3, the load device 10 is illustrated in a top and cross sectional view. As can be seen, tube forward section 31, more particularly its point of direct exposure to R.-F. power, commences at a point 35 along the axial length of the waveguide. At the same time it is noted that tube section 32 similarly commences at a position 36 along the axial length of the waveguide. The difference $t$ in spacing between the points 35 and 36 as measured along the axial dimension of the waveguide is about a quarter guide wavelength. By this means there is obtained an approximate cancellation of the two associated reflections at the effective input of the device 10, the effective input being particularly defined as those discontinuity points 35 and 36. Further improvements in matching may be obtained by slanting the beginning of one of the tube slots to make the two reflections more equal. At the opposite (terminating) end of the load the attenuating properties of the line should not be terminated abruptly. The tube should be extended with approximately the same slope until the space between them is close enough so that complete absorption of the forward wave is achieved before any abrupt discontinuity is placed in the line.

Figure 4:
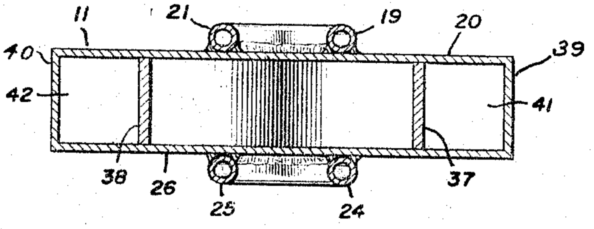
FIG. 4 is a cross sectional view of a further modification of this invention.

In addition to the absorber coolant tube method for the absorption of power, waveguide 11 may utilize a semiconductor material for the waveguide narrow sidewall with a fluid coolant flowing on the outside as shown in FIG. 4. In FIG. 4 the cross sectional illustration is generally similar to the cross sectional illustration of FIG. 2. Waveguide body or section 11 includes axially extending wall means 37 and 38 which define, in combination with sidewalls 39 and 40, axially extending coolant channels 41 and 42. Channels 41 and 42 may be of the straight through forward kind, or of the forward and return kind as described with respect to tubes 31 and 32. Specifically, walls 37 and 38 are made of a semiconductive material having a resistivity and dielectric constant effective to provide substantial R.-F. power absorption. Power absorption takes place in the material itself although some R.-F. power may pass through walls 37 and 38 to be absorbed in the coolant flowing in channels 41 and 42. The R.-F. power absorption characteristics of non-metals including carbon or graphite as well as metals including stainless steels may be employed. The thickness of walls 37 and 38 as well as the vertical or height dimension may be varied along the waveguide.

It is an important feature of this invention that the waveguide unit be tapered from the R.-F. power effective input end to the terminating or opposite end so that the tube sections 31 and 32 commence at relatively wide separation at the waveguide effective input end, particularly at the juncture of neck section 12 and waveguide 11, and approach nearer each other at the opposite end. This taper is required of the tube sections 31 and 32 and must be one which will provide uniform power absorption per unit length. Accordingly, such a taper is defined within relatively close limits. For example, the most accurate form of this taper involves a smooth curvilinear taper for each power handling capacity. Curvilinear indicates that each tube section 31 and 32 and/or sidewalls 27 and 28 are curved transversely to approach each other at the closed end of the device 10. The curve is generally convex along the exterior of the waveguide and is similar for each sidewall. The taper is predetermined to provide uniform power absorption per unit axial length. The taper may, however, be approximated by a straight line with good results.

A technical analysis utilized to determine dimensions is as follows.

*Analysis*

Figure 5:
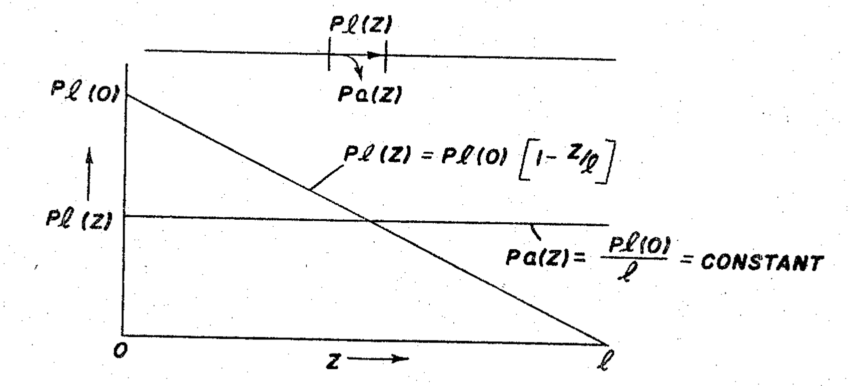
FIG. 5 is a series of curves depicting the ideal distribution of power absorption in a load.

One of the most desirable distributions of power absorption includes having uniform absorption over the length of the load. This form of distribution results in linear decay of line power. Power relations along a line of length $l$ for this ideal condition would be as shown in FIG. 5, where $P_1$ $(z)$=power transmitted through the waveguide
$P_a$ $(z)$=power per unit length absorbed
$z$=position along waveguide from beginning of absorbing region Also, to completely determine the design the initial width $a(o)$ and attenuation $\alpha(o)$ must be known. This can best be accomplished by constructing a uniform line of the type where the slot begins and measuring the attenuation.

Figure 6:
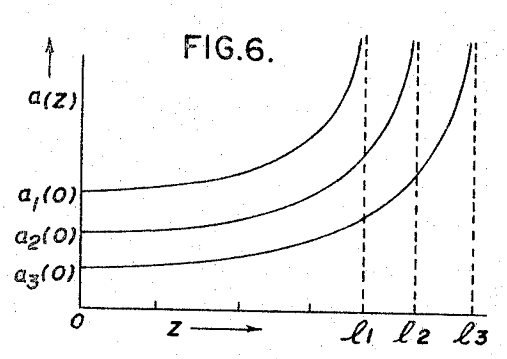
FIG. 6 is a series of curves illustrating relations between attenuation and load length.

Note in particular that the length of the load is determined by the initial attenuation. The relation between attenuation and $z$ for different $\alpha(o)$ is shown approximately in the illustration of FIG. 6.

In the operative embodiment as illustrated in FIG. 2 where the distance between tubes 31 and 32 at the effective input end was 1.5 inch and the sidewall height was 0.622 inch, the load was designed to operate at maximum power level at frequencies from 8.0 to 8.7 gc. The measured value of attenuation for a waveguide of this cross section was $$\alpha(0)=.05409\ \frac{\text{nepers}}{\text{in}}$$

By the mathematical method described hereafter, this value of initial attenaation requires a load length of $$l=9.244 \text{ in.}$$

Figure 7:
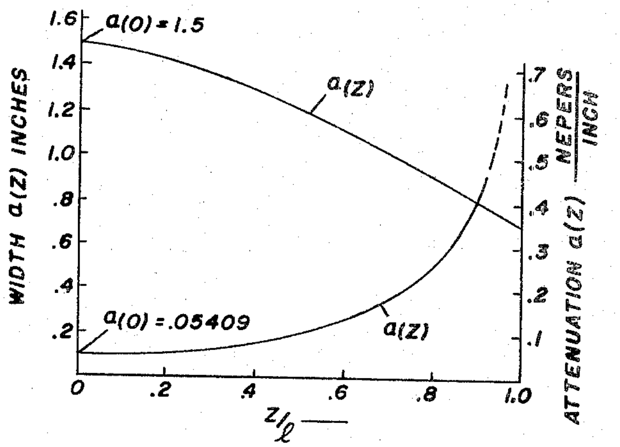
FIG. 7 is an illustration of a pair of curves denoting calculated width and attenuation in a load.

The calculated width $a(z)$ and attenuation $\alpha(z)$ are shown in FIG. 7.

It may be noted at this point that this method of determining $a(z)$ does not specify what $$\frac{d}{dz}a(z)/z=0$$

should be.

It was found by experimentation that if this quantity is made equal to zero the VSWR and power distribution characteristics are approximately optimum. It is not generally feasible to have this quantity much different from zero and still have a smooth curve for $a(z)$ in the neighborhood of $z=0$. At the terminating end of the load $(z=l)$ the attenuating properties of the line should not be terminated abruptly. The tubes should be extended with approximately the same slope until the space between them is close enough so that complete absorption of the forward wave is achieved before any abrupt discontinuity is placed in the line.

The measured power distribution of this load as determined by hereinafter derived Equation 16 is shown in FIG. 8. Also shown on this figure for comparison are the curves for ideal (uniform) absorption and a measured curve for a commercially available load of uniform cross section with a narrow slot on one side only.

The measured VSWR of the experimental load from 8.0 to 8.7 gc. is shown in FIG. 9.

*Mathematic derivation*

The amount of power $P_a$ absorbed in the slot per unit length will be essentially proportional to the square of the voltage across the slot which is in turn proportional to the square of transverse current density in the waveguide wall $$P_a—KI_{TM}2 \qquad (1)$$

where $K$=a constant

The $H_{10}$ mode in rectangulare waveguide can be represented by two plane waves propagating at an angle $\theta$ from the axis of the waveguide as shown in FIG. 10.

Referring to FIG. 10.

$$\tan\theta=\frac{\frac{\lambda}{4}}{\sqrt{\left(\frac{a}{2}\right)^2+\left(\frac{\lambda}{4}\right)^2}}=\frac{I_{\mathrm{Tm}}}{I_{\mathrm{Lm}}}$$

or $$\tan^2\theta=\frac{\lambda^2}{(2a)^2-\lambda^2}=\left(\frac{I_{\mathrm{TM}}}{I_{\mathrm{LM}}}\right)^2 \qquad (2)$$

where $\lambda$=wavelength in unbounded medium $I_{\mathrm{TM}}$=maximum transverse current density in waveguide wall $I_{\mathrm{LM}}$=maximum longitudinal current density in waveguide wall The power transmitted through the waveguide $P_1$ will be twice the power associated with each of the composite plane waves $$P_1=2\left[1/2(I_{\mathrm{PM}}a\cos\theta)^2\eta\frac{b}{a\cos\theta}\right]$$
$$=I_{\mathrm{PM}}^2\eta ab\cos\theta$$
$$=\left(1/2\frac{I_{\mathrm{LM}}}{\cos\theta}\right)^2\eta ab\cos\theta$$
$$=\frac{\eta}{4}I_{\mathrm{LM}}^2\frac{ab}{\sqrt{1-\left(\frac{\lambda}{2a}\right)^2}} \qquad (3)$$

where $I_{\mathrm{PM}}$=maximum current density associated with each plane wave $\eta$=impedance of the medium in the waveguide $a$=width of the waveguide (broad wall)

$b$=height of the waveguide (narrow wall)

By use of Equations 1, 2, and 3, the ratio of power absorbed per unit length $P_a(z)$ to power transmitted through the waveguide $P_1(z)$ may be written $$\frac{P_a(z)}{P_1(z)}=\frac{8K}{\eta b\lambda}\frac{\left(\frac{\lambda}{2a}\right)^3}{\sqrt{1-\left(\frac{\lambda}{2a}\right)^2}} \qquad (4)$$

If it is now assumed that the change in waveguide width is a very gradual function of longitudinal position then the waveguide modes in a gradually tapered waveguide are essentially the same as for a uniform waveguide. In this case the quantities in (4) can be written as functions of $(z)$.

$$\frac{P_a(z)}{P_1(z)}=\frac{8K}{\eta b\lambda}\frac{\left(\frac{\lambda}{2a(z)}\right)^3}{\sqrt{1-\left(\frac{\lambda}{2a(z)}\right)^2}} \qquad (5)$$

Applying the boundary condition on a $(z)$ at $z=0$ and letting $$P_{\mathrm{R}}(z)=\frac{P_a(z)}{P_1(z)}$$

$$P_{\mathrm{R}}(z)=\frac{P_a(z)}{P_1(z)}=\frac{P_{\mathrm{R}}(0)}{\phi\left(\frac{\lambda}{2a(0)}\right)}\phi\left(\frac{\lambda}{2a(z)}\right) \qquad (6)$$

where $$\phi\left(\frac{\lambda}{2a(z)}\right)=\frac{\left(\frac{\lambda}{2a(z)}\right)^3}{\sqrt{1-\left(\frac{\lambda}{2a(z)}\right)^2}}$$

A general relation between attenuation and power flow in a transmission line may be derived as follows; consider a short section of line as shown schematically in FIG. 11.

Referring now to FIG. 11, the following equation is given.

$$P_a(z)dz=P_1(z-dz/2)-P_1(z+dz/2) \qquad (7)$$

or $$\frac{P_a(z)dz}{P_1(z)}\simeq 2\left[\frac{P_1\left(z-\frac{dz}{2}\right)}{P_1(z)}-1\right]=2[e^{\alpha(z)dz}-1] \qquad (8)$$

This Equation 8 amounts to a definition of a power attenuation function $\alpha(z)$ such that in general $$e^{-2\alpha(z)dz}\simeq\frac{P_1(z+dz)}{P_1(z)} \qquad (9)$$

Inverting Equation 8

$$\alpha(z)\simeq\frac{1}{dz}\log_e\left[\frac{1}{2}\left(\frac{Pa(z)dz}{P_1(z)}\right)+1\right] \qquad (10)$$

Up to this point the power absorption function $P_r(z)$ has not been specified and any desired one might be used as long as it was a smooth gradually varying function of $z$. Using the linear power absorption function shown in FIG. 1

$$P_{\mathrm{R}}(z)dz=\frac{P_a(z)dz}{P_1(z)}=\frac{dz}{l-z}=2[e^{\alpha(z)dz}-1] \qquad (11)$$

or $$l-z=\frac{dz}{2[e^{\alpha(z)dz}-1]} \qquad (12)$$

Let $z=0$ in (12)

$$l=\frac{dz}{2[e^{\alpha(0)dz}-1]} \qquad (13)$$

To evaluate this Equation 13 expand the exponential in series form and let $dz\rightarrow 0$ Then $$l=\frac{1}{2\alpha(0)}=\frac{1}{P_{\mathrm{R}}(0)} \qquad (14)$$

For the ideal condition (uniform absorption) Equation 6 can be rewritten $$P_{\mathrm{R}}(z)=\frac{1}{l-z}=\frac{1}{l\phi\left(\frac{\lambda}{2a(0)}\right)}\phi\left(\frac{\lambda}{2a(z)}\right) \qquad (15)$$

where $$\phi=\left(\frac{\lambda}{2a(z)}\right)=\frac{\left(\frac{\lambda}{2a(z)}\right)^3}{\sqrt{1-\left(\frac{\lambda}{2a(z)}\right)^2}}$$

Solution of Equation 15 to obtain $a(z)$ for a given $P_{\mathrm{R}}(z)$ involves solution of a cubic equation in $$\frac{\lambda}{2a(z)}$$

It is much easier and sufficiently accurate to plot $$\phi\frac{\lambda}{2a(z)}$$

as shown in FIG 12 and for given values of $P_{\mathrm{R}}(z)$ read off graphically the required values of $$\frac{\lambda}{2a(z)}$$

A general relation between the power distribution $P_1(z)$ along an inhomogenous attenuating line and the VSWR measured at the input, $\mathrm{VSWR}_0$ $(z)$, with a short at position $z$ along the line can be derived from the definitions of attenuation, VSWR and voltage reflection coefficient. The absolute value of the input voltage reflection coefficient will be $$|R_0(z)|=\frac{\mathrm{VSWR}_0(z)-1}{\mathrm{VSWR}_0(z)+1}=e^{-2\int_0^z\alpha(z)dz}$$

or $$\frac{P_1(z)}{P_1(0)}=\frac{\mathrm{VSWR}_0(z)-1}{\mathrm{VSWR}_0(z)+1} \qquad (16)$$

It is assumed here that changes in the line characteristics occur gradually enough so that reflections from this cause may be ignored.

This invention provides an improved load device of uniform power absorption characteristics. By adopting a given and/or desirable value for a particular circumstance all other interrelated values are, as the analysis indicates, predeterminedly derived. For example, the chosen value of transverse currents will control the required structural dimensions and taper of the device.

While this invention has been described with reference to particular and exemplary embodiments thereof, it is to be understood that numerous changes can be made by those skilled in the art without actually departing from the invention as disclosed, and it is intended that the appended claims include all such equivalent variations as come within the true spirit and scope of the foregoing disclosure.

What is claimed and desired to be secured by Letters Patent of the United States is:

1. A high power microwave load device comprising in combination (a) an axially extending tubular metal waveguide member having an input end and a terminating end,
(b) said waveguide having wall portions defining a width dimension and sidewall portions defining a height dimension,
(c) the said width dimension being sufficient in terms of wavelength to suppress transverse currents to a predetermined low level,
(d) a pair of oppositely positioned R.-F. power absorption means commencing generally at said input and extending axially along said sidewalls,
(e) the space between the commencement of said power absorption means at said inlet being sufficient in terms of wavelengths so that said power absorber means is only subjected to said predetermined low level of transverse currents,
(f) said power absorption means each tapering along the axial length of said waveguide to approach each other at a rate commensurate with uniform power absorption thereof per unit length,
(g) said power absorption means being of constant cross section along its length within said waveguide.

2. The invention as recited in claim 1 wherein said power absorption means comprises an axially extending semiconductor material effective for absorbing a large portion of the R.-F. power.

3. A high power microwave load comprising in combination (a) an axially extending metal waveguide of a rectangular cross section having an input end and a terminating end,
(b) said waveguide having walls defining a width dimension and sidewall portions defining a height dimension,
(c) said width dimension at the input end being sufficient in terms of wavelengths to provide a desired low level of transverse sidewall currents,
(d) means defining a pair of oppositely positioned R.-F. power absorption fluid conduit means commencing generally at said inlet and along said waveguide and along each sidewall portion,
(e) the initial distance between said power absorption conduit means at said input being sufficient commensurate with said width dimension to subject said conduit means only to said low level of transverse currents,
(f) each of said conduit means tapering so that their spaced apart dimension progressively decreases along the length of said waveguide to provide substantial uniform power absorption,
(g) means to pass R.-F. power through said waveguide so that said R.-F. power passes into said conduits, and
(h) means to pass a coolant fluid through said channels to absorb said power as heat energy in a direction from the input end of said waveguide towards said terminating end,
(i) each of said fluid conduit means having a constant diameter extending over the effective length thereof within said waveguide.

4. The invention as recited in claim 3 wherein said conduits are fluid flow crossover connected at the smaller end of said waveguide, and inlet and exit means are provided therefor at the inlet end of said waveguide.

5. The invention as recited in claim 3 wherein the height of said conduit means is substantially equal to the interior height of said waveguide.

6. A high power microwave load comprising in combination, (a) an axially extending metal waveguide of a rectangular cross section having an inlet end and a terminating end,
(b) said waveguide having top and bottom walls defining a width dimension and sidewalls defining a thickness dimension,
(c) said width dimension being sufficiently large so that transverse sidewall currents are of a predetermined low value,
(d) the said waveguide tapering from a larger width dimension at its inlet end to a minimum width dimension at its terminating end,
(e) a dielectric electromagnetic wave permeable material tube in said waveguide extending axially along and adjacent said sidewalls with a crossover connection at the smaller end of said waveguide,
(f) fluid inlet and exit means at the input end of said waveguide for said tube to pass a fluid coolant in opposite directions through said waveguide,
(g) the lateral distance between said tubes being sufficiently large so that said tubes are subjected only to transverse said predetermined low level transverse current,
(h) means to pass R.-F. power through said waveguide so that said tubes pass said power into said fluid in said tubes for conversion to heat energy,
(i) said taper being approximately equal to the theoretical curve defining uniform power absorption per unit length of said waveguide for a predetermined power capacity,
(j) said tube having a constant diameter from said inlet end to said terminating end.

7. The invention as recited in claim 6 wherein coolant conduits are provided adjacent said waveguide top and bottom walls for cooling said walls and means connecting said conduits to said fluid entrance and exit means.

8. A high power microwave load comprising in combination, (a) an axially extending metal waveguide of a rectangular cross section having an input end and a terminating end,
(b) said waveguide having top and bottom walls defining a width dimension and end walls defining a thickness dimension,
(c) the said width dimension being sufficient to reduce transverse currents to a predetermined low level,
(d) the said waveguide tapering from a larger width dimension at its input end to a minimum width dimension at its terminating end at a predetermined rate,
(e) oppositely disposed R.-F. power absorbing means commencing at predetermined locations at said waveguide inlet and extending axially along and adjacent said sidewalls, (f) the lateral distance between said absorbing means being substantially greater than said thickness dimension and sufficiently large so that said absorbing means are subjected only to said low level transverse current, (g) the commencing ends of said absorbing means being spaced apart in the axial direction a distance about a quarter guide wavelength, (h) means to pass R.-F. power into said waveguide, and (i) channel means in said waveguide adjacent said absorber for circulation of a coolant therethrough so that said R.-F. power passing through said absorber is converted to heat energy in said coolant, (j) said absorbing means having constant dimensions over the length thereof extending from said input end to said terminating end of said waveguide, (k) said coolant circulating along one side of said waveguide from said inlet end to said terminating end, and along an opposite side of said waveguide from said terminating end to said inlet end.

References Cited by the Examiner

UNITED STATES PATENTS

| | | | |
|---|---|---|---|
| 2,560,536 | 7/1951 | Althouse | 333—22 |
| 2,567,210 | 9/1951 | Hupcey | 333—22 |
| 2,877,428 | 3/1959 | Krstansky et al. | 333—22 |
| 3,030,592 | 4/1962 | Lamb et al. | 333—22 |
| 3,147,451 | 9/1964 | Merdinian | 333—22 |

ELI LIEBERMAN, *Primary Examiner.*

HERMAN KARL SAALBACH, R. F. HUNT, M. NUSSBAUM, *Assistant Examiners.*

UNITED STATES PATENT OFFICE
CERTIFICATE OF CORRECTION

Patent No. 3,312,914 April 4, 1967

Morris F. Bolster

It is hereby certified that error appears in the above numbered patent requiring correction and that the said Letters Patent should read as corrected below.

Column 6, line 5, column 7, lines 18, 23, 40, 41, 55, and 6 column 8, lines 4, 7, 11, 12, 18, and 25 and column 9, lines 4 and 5, for "$P_1$", each occurrence, read -- $P_\ell$ --; column 6, line 30, for "attenaation" read -- attenuation --; line 73, for "rectangulare" read -- rectangular --; column 7, in the first equatio for "$\frac{I_{Tm}}{I_{Lm}}$" read -- $\frac{I_{TM}}{I_{LM}}$ --.

Signed and sealed this 7th day of November 1967.

(SEAL)
Attest:

Edward M. Fletcher, Jr.
Attesting Officer

EDWARD J. BRENNER
Commissioner of Patents